W. RÜHLING.
ARC LAMP.
APPLICATION FILED APR. 19, 1911.
1,001,453.
Patented Aug. 22, 1911.
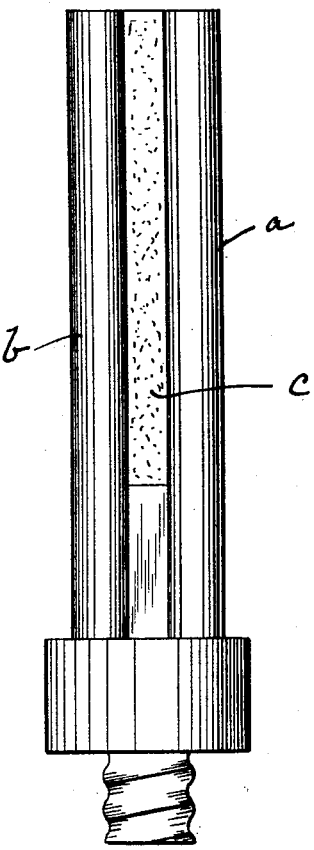

UNITED STATES PATENT OFFICE.

WALDEMAR RÜHLING, OF BERLIN, GERMANY.

ARC-LAMP.

1,001,453. Specification of Letters Patent. Patented Aug. 22, 1911.

Application filed April 19, 1911. Serial No. 622,086.

*To all whom it may concern:*

Be it known that I, WALDEMAR RÜHLING, a subject of the King of Prussia, residing at 24/25, Zehdenickerstrasse, Berlin, Germany, have invented certain new and useful Improvements in Arc-Lamps; and I do hereby declare the following to be a full, clear, and exact description of the invention.

The present invention relates to arc lamps and particularly to the type in which the electrodes are arranged beside each other being insulated by an interposed barrier which is gradually consumed by the arc, but which upon the extinction of the latter forms a conducting bridge between the electrodes by which the arc may be again started upon the switching in of the current. I have heretofore proposed for this purpose to combine with the refractory material which composes the body of the barrier a suitable amount of metal and carbon, the latter being present in sufficient quantity to prevent, through its reducing action, the oxidation of the metal in the conducting bridge formed between the electrodes, and a flux being added, if desired, to prevent the formation of clinkers at the electrode tips.

I have now discovered that an improved result is obtained if certain metal compounds are employed, instead of pure metal, in the barrier for the formation of the conducting bridge. As examples of such metal compounds, malachite, copper-pyrites, argentite or silver-glance ($Ag_2S$) and red silver may be mentioned. Metallic oxids and their compounds cannot be advantageously employed in the barrier, since they demand the presence in the barrier of so large a quantity of the necessary reducing agent, viz., carbon, graphite or the like—that the barrier itself is thereby rendered conducting and the utility of the lamp as an arc lamp, thus destroyed. Various other non-oxid metallic compounds may be combined with the reducing agent in the barrier, provided such compounds are of such character that the resultant bridge formed between the electrodes upon the extinction of the arc, is a conductor of electricity adapted to be consumed and thus to start the arc upon the switching in again of the lamp circuit. I, therefore, do not limit my invention to the particular metallic compounds specified.

I claim as my invention:—

1. In an arc lamp having juxtaposed electrodes, an insulating barrier separating said electrodes and containing malachite and carbon, whereby upon the extinction of the arc there is formed between the electrodes a conducting bridge adapted to be consumed and thus to automatically start the arc upon the current being again switched into the lamp.

2. In an arc lamp having juxtaposed electrodes, an insulating barrier separating said electrodes and containing carbon and a metallic compound capable upon the extinction of the arc of forming a conducting bridge between the electrodes under the influence of a less quantity of carbon than is necessary to effect the reduction of an oxid of the same metal, substantially as described.

In testimony whereof I have signed my name to this specification, in the presence of two subscribing witnesses.

WALDEMAR RÜHLING.

Witnesses:
HENRY HASPER,
RICHARD GOETZ.

---

Copies of this patent may be obtained for five cents each, by addressing the "Commissioner of Patents, Washington, D. C."